US012254466B1

(12) United States Patent
Behera et al.

(10) Patent No.: US 12,254,466 B1
(45) Date of Patent: Mar. 18, 2025

(54) SKIMMER AND SHIMMER IDENTIFICATION AND PREVENTION SYSTEM

(71) Applicant: Bank of America Corporation, Charlotte, NC (US)

(72) Inventors: Abhijit Behera, Hyderabad Telengana (IN); Maneesh Kumar Sethia, Hyderabad Telangana (IN); Rajasekhar Madala, Hyderabad Telangana (IN); Ajay Kumar Gowni, Hyderabad Telangana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/735,419

(22) Filed: Jun. 6, 2024

(51) Int. Cl.
| | |
|---|---|
| *G06Q 20/38* | (2012.01) |
| *G01D 5/24* | (2006.01) |
| *G06Q 20/34* | (2012.01) |
| *G07F 19/00* | (2006.01) |
| *H04L 9/06* | (2006.01) |
| *H04L 9/30* | (2006.01) |
| *H04L 9/32* | (2006.01) |

(52) U.S. Cl.
CPC ............ *G06Q 20/382* (2013.01); *G01D 5/24* (2013.01); *G06Q 20/3567* (2013.01); *G07F 19/2055* (2013.01); *H04L 9/0631* (2013.01); *H04L 9/302* (2013.01); *H04L 9/3271* (2013.01)

(58) Field of Classification Search
CPC ..... G06Q 20/382; G06Q 20/3567; G01D 5/24

USPC ........................................................ 235/379
See application file for complete search history.

(56) References Cited

U.S. PATENT DOCUMENTS

| | | | | |
|---|---|---|---|---|
| 9,214,051 | B1 * | 12/2015 | Newman | .................. G07F 19/20 |
| 12,190,187 | B1 * | 1/2025 | Bitter | ................ G06K 19/06196 |
| 12,206,491 | B2 * | 1/2025 | Johnston | ................... H04K 3/86 |
| 2019/0005503 | A1 * | 1/2019 | Hecker | ................ G06Q 20/341 |
| 2022/0083747 | A1 * | 3/2022 | Carapelli | ........... G06K 13/0868 |
| 2023/0410114 | A1 * | 12/2023 | Yin | ........................ G06Q 20/341 |
| 2024/0256800 | A1 * | 8/2024 | McGrath | ................ G06K 7/087 |
| 2024/0362670 | A1 * | 10/2024 | Waughtal | ............. G06Q 20/204 |

\* cited by examiner

*Primary Examiner* — Allyson N Trail
(74) *Attorney, Agent, or Firm* — Weiss & Arons LLP

(57) ABSTRACT

Methods, systems and apparatus for dynamic multi-level detection of compromised transaction receivers are provided. The apparatus may include a sensor communication module ("SCM") to monitor a transaction between a card and a card reader. The apparatus may include a terminal software module ("TSM") configured to compare sensor data with data included in a threshold lookup table. Based on the comparison, the TSM may output a threshold status. The status may indicate a violation or confirmation. The apparatus may include a dynamic mutual cryptographic authenticator ("DMCA"). The DMCA may terminate the transaction in response to receipt of the threshold violation. The DMCA may initiate an encrypted challenge response communication module ("ECRCM") in response to receipt of the threshold confirmation. The ECRCM may verify decryption and exchange of challenges between the card and the card reader. In response to confirming the decryption and exchange of the challenges, the transaction may be authenticated.

21 Claims, 4 Drawing Sheets

SKIMMER AND SHIMMER IDENTIFICATION AND PREVENTION SYSTEM

FIELD OF TECHNOLOGY

Aspects of the disclosure relate to payment card security.

BACKGROUND OF THE DISCLOSURE

Despite existing security measures, automated teller machine ("ATM") skimming and shimming pose a significant threat to cardholders. ATM skimming and shimming cause annual losses of billions of dollars.

ATM skimming is a type of payment card fraud, in which people of malicious intent retrieve data from payment cards by rigging card readers with hidden recording devices. Existing skimming detection systems primarily rely on magnetic stripe analysis, which can be bypassed by shimmers and other modern skimming devices. Also, current skimming detection systems often trigger false positives, which may lead to unnecessary inconvenience for legitimate cardholders.

ATM shimming is another type of payment card fraud, in which people of malicious intent retrieve data from chip cards by placing a super-thin shim between the chip and the chip reader inside the ATM. The super-thin shim may capture card data and a personal identification number ("PIN").

Shimming allows for chip card information to be misappropriated from payment cards. Shimming uses a thin reader called a shim that fits into a card reader slot at a retailer or ATM. These shims contain a microchip and flash storage that capture and save card information from a chip card. Unlike the one-time transaction token generated by chip cards, the information captured by a shim includes details used to authenticate and process future transactions.

People of malicious intent may retrieve the shim and use the retrieved card information to create false cards with false magnetic stripes. The false cards may be used to perform fraudulent transactions. It should be noted that such false cards with false magnetic stripes may not arouse suspicion because chip cards also typically contain a magnetic stripe as backup in the event of a failure of the card chip component.

Traditional magnetic stripe-based detection methods are often ineffective against fraudulent skimming and shimming devices that employ overlays, shims or hidden scanners. Therefore, there exists a need for an adaptable skimming and shimming detection system that protects cardholder information.

Therefore, it may be desirable to provide a multi-level detection system to detect skimming and shimming. It may be desirable for such a skimming and shimming identification system to detect complex shimmers and skimmers and prevent execution of bypass transactions using fraudulently retrieved payment card data.

SUMMARY OF THE DISCLOSURE

Systems, apparatus and methods for dynamic multi-level detection of compromised transaction receivers are provided.

Methods may include monitoring a transaction between a card and a card reader. The monitoring may be executed in real-time during transaction processing. Methods may include monitoring the transaction between the card and the card reader using a sensor communication module ("SCM").

The transaction receiver may be a point of sale ("PoS") device, an automated teller machine ("ATM"), a card reader and/or any suitable computing device that is able to read a card. The card may be a payment card such as a credit card or debit card, a smart card and/or any suitable transaction card. The card may include a magnetic strip. The card may include an embedded microprocessor chip (also referred to as an Europay, Mastercard and Visa ("EMV") chip). The transaction receiver may be configured to read the magnetic strip and/or the chip.

The SCM may execute on a computing device. The computing device may be a desktop computer, laptop, tablet, smartphone and/or any other suitable computing device. The computing device may include a processor and any other suitable hardware and/or software. The computing device may be a component of the transaction receiver. The computing device may be separate from the transaction receiver. The computing device may be in electronic communication with the transaction receiver. The SCM may monitor an attempted transaction between the card and the card reader.

The SCM may be in electronic communication with a sensor module. The sensor module may be installed in the card reader. The sensor module may include one or more capacitive and magnetic sensors. The one or more capacitive and magnetic sensors may be installed in the card reader. The one or more sensors may be installed at strategic points in the card reader, such as, for example, where contact between the card and the card reader is expected. The one or more sensors may continuously monitor changes in capacitance between the card and the card reader. The one or more sensors may continuously monitor the presence of additional magnetic fields between the card and the card reader.

The one or more capacitive sensors may measure changes between the card and the card reader by detecting variations in capacitance. The one or more capacitive sensors may be calibrated to establish a baseline capacitance level when there is no card present at the card reader. The baseline may serve as a reference for detecting capacitance changes. A change in capacitance may indicate the presence and/or strength of a skimming and/or shimming device. As such, the one or more capacitive sensors may identify the presence and strength of skimming and/or shimming devices.

The one or more magnetic sensors may measure changes in magnetic fields surrounding the card and the card reader. The magnetic sensors may identify the presence and strength of skimming and/or shimming devices. The one or more magnetic sensors may include inductive magnetic sensors. Inductive magnetic sensors may operate on the principle of electromagnetic induction. It should be noted that changes in the magnetic field may induce a voltage in a coil, and this voltage may be used by the magnetic sensors to measure field strength. Inductive sensors may be used for non-contact position sensing and metal detection.

A threshold may be set for capacitance changes and/or for additional magnetic fields that may indicate card insertion or removal. This threshold may be based on the expected range of capacitance variations during normal usage. The threshold may be stored in a threshold lookup table. The threshold lookup table may be stored in a memory location. The memory location may be included in the transaction receiver. The memory location may be remote from the transaction reader. The memory location may be located within random access memory ("RAM"), read only memory ("ROM"), electrically erasable programmable read-only memory ("EEPROM"), flash memory, cache memory, cloud memory and/or any suitable memory location. The threshold lookup table may be a dynamic lookup table. The threshold lookup table may be updated by the SCM module. The threshold lookup table may be updated continually by the SCM module.

The SCM module may include a communication module. The communication module may receive and transmit sensor data transmitted from the one or more capacitive and magnetic sensors. The communication module may include a transceiver. The communication module may receive and transmit sensor data using any suitable data transfer methods. The communication module may transmit the sensor data to a terminal software module ("TSM").

The TSM may execute on the computing device. The TSM may receive the sensor data transmitted from the communication module. The TSM may compare the received sensor data to the data stored in the threshold lookup table. Based on the comparison the TSM may output a threshold status. The threshold status may identify a threshold violation or threshold confirmation. The threshold status may include a threshold violation. The threshold violation may indicate that the sensor data fails to conform with the data included in the threshold lookup table. The threshold confirmation may indicate that the sensor data conforms with the data included in the threshold lookup table. The TSM may output a threshold violation or a threshold confirmation.

The TSM may transmit the threshold status to a dynamic mutual cryptographic authenticator ("DMCA"). The DMCA may execute on the computing device. The DMCA may receive the threshold status. In response to receipt of the threshold violation, the DMCA may terminate the transaction. Terminating the transaction may include instructing the card reader to terminate communication with the card. In the event that the transaction is terminated, the DMCA may transmit an alert to a cardholder of the card. The alert may be transmitted via the card reader. The alert may include a vibration. The alert may include a blinking light indicator. The alert may be transmitted via a computing device (such as a mobile device, tablet or personal computer) associated with the cardholder. The alert may be transmitted via a short message service ("SMS"), email, telephone call, push notification or any other suitable transmission method.

The alert may be transmitted to an entity associated with the card. The alert may be transmitted via SMS, email, telephone call, push notification or any other suitable transmission method to the entity associated with the card. The entity may terminate substantially all transactions associated with the card in response to receiving an alert that the card was in contact with a card reader device identified as being linked to a skimming and/or shimming device. The entity may request an additional factor of authentication for substantially all transactions associated with the card in response to receiving an alert that the card was in contact with a card reader device identified as being linked to a skimming and/or shimming device.

In response to receipt of the threshold confirmation, the DMCA may initiate (or instantiate an instance of) an encrypted challenge response communication module ("ECRCM"). The ECRCM may execute on the computing device. The ECRCM may initiate a challenge response protocol through the communication module.

The challenge response protocol may trigger the card reader to transmit a first challenge to the card. The first challenge may be a randomized number to be authenticated. The randomized number may be included in a cryptographic token. The first challenge may include any suitable authenticator. In response to receiving the first challenge, the card may encrypt the first challenge at the card using a first private key included in the card. After encrypting the first challenge, the card may transmit the encrypted first challenge from the card to the card reader.

The card reader may receive the encrypted first challenge from the card. In response to receiving the encrypted first challenge, the card reader may decrypt the encrypted first challenge using a second private key included in the card reader. After successfully decrypting the encrypted first challenge, the card reader may send a first confirmation confirming the decryption of the encrypted first challenge to the card.

In response to receipt of the first confirmation confirming decryption of the encrypted first challenge by the card reader, the card may transmit a second challenge to the card reader. The second challenge may be a second randomized number to be authenticated. The second randomized number may be included in a cryptographic token. The second challenge may be any suitable authenticator. The second challenge may be different from the first challenge. The second challenge may be encrypted with a first public key included in the card. The card reader may receive the second challenge. In response to receiving the second challenge, the card reader may decrypt the second challenge using the second private key. After decrypting the second challenge, the card reader may re-encrypt the second challenge using a second public key included in the card reader. After re-encrypting the second challenge the card reader may transmit the re-encrypted second challenge to the card.

The card may receive the re-encrypted second challenge. The card may decrypt the re-encrypted second challenge. The card may transmit a second confirmation confirming decryption of the re-encrypted second challenge to the card reader. In response to receiving a second confirmation confirming decryption of the re-encrypted second challenge by the card, the card reader may authenticate the transaction. Upon authenticating the transaction, the card reader may retrieve card data from the card. The card reader may transmit the card data to a transaction processing system. The transaction processing system may process the card data as a transaction.

In the event that that the card does not receive the first confirmation and/or the card reader does not receive the second confirmation, the transaction may be terminated. Terminating the transaction may include instructing the card reader to terminate communication with the card. In the event that the transaction is terminated, an alert may be transmitted to a user associated with the card. The alert may be transmitted via the card reader. The alert may include a vibration. The alert may include a blinking light indicator.

Encrypting the first challenge may include encrypting using an advanced encryption standard ("AES") algorithm. Encrypting the first challenge may include encrypting using a Rivest-Shamir-Adleman ("RSA") algorithm. Encrypting the second challenge may include encrypting using an AES algorithm. Encrypting the second challenge may include encrypting using an RSA algorithm. Challenges may be dynamically changed by including a timestamp, location, unique device identifier for key exchange and signatures and/or any other suitable changes. Different challenges may be used for different transactions to prevent pre-recorded attacks.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which.

DETAILED DESCRIPTION OF THE DISCLOSURE

Figure 1:
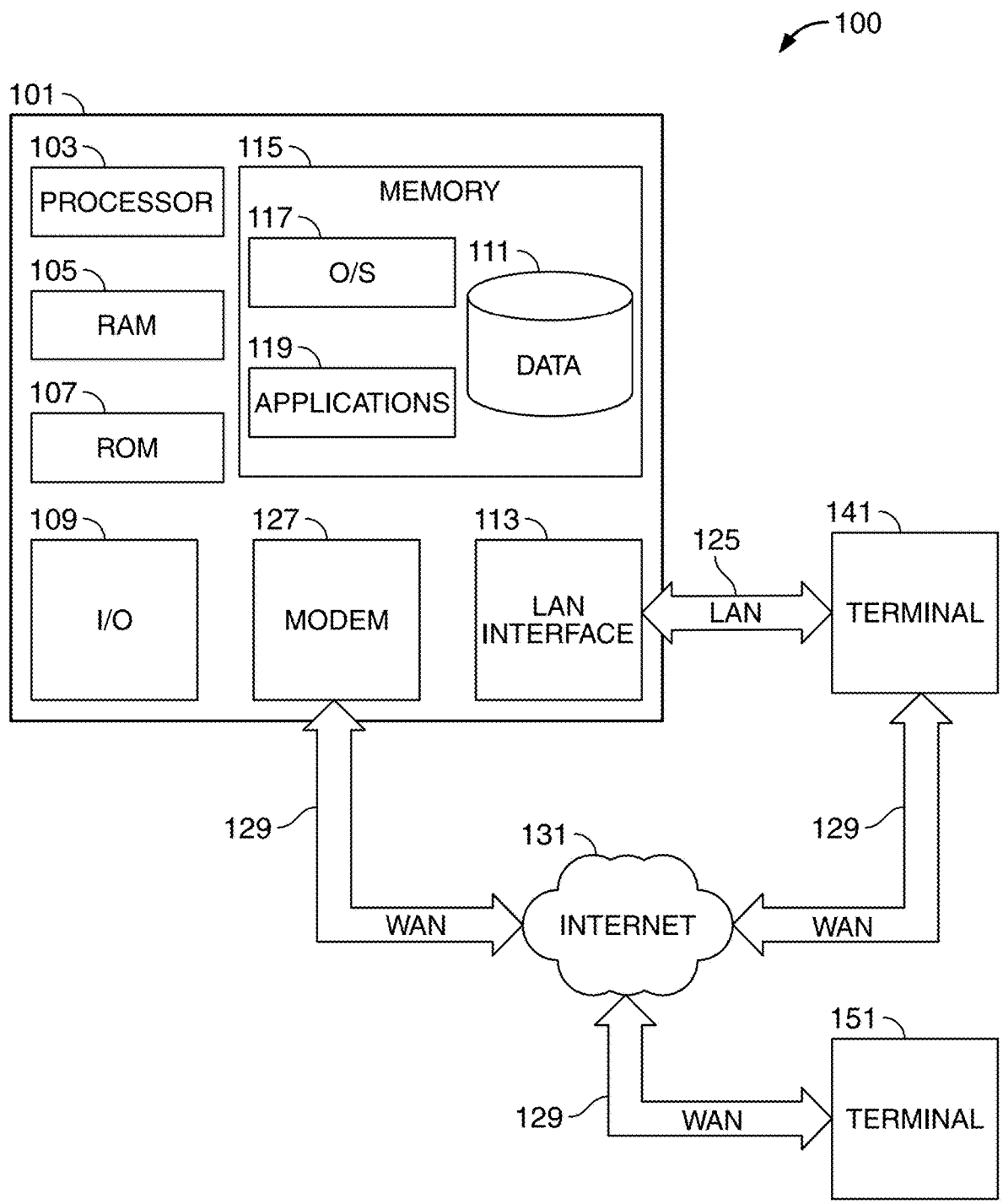
FIG. 1 shows an illustrative diagram in accordance with principles of the disclosure.

Systems, apparatus and methods for dynamic multi-level detection of compromised transaction receivers.

The apparatus may include a transaction receiver. The transaction receiver may be a point of sale ("PoS") device, an automated teller machine ("ATM"), a card reader and/or any suitable computing device that includes card reading capabilities. The card may be a payment card, such as a credit card or debit card, a smart card and/or any suitable transaction card. The card may include a magnetic strip. The card may include a microprocessor chip. The transaction receiver may be configured to read the magnetic strip and/or the chip.

The apparatus may include a sensor communication module ("SCM"). The SCM may execute on a computing device. The computing device may be a desktop computer, laptop, tablet, smartphone and/or any other suitable computing device. The computing device may include a processor and any other suitable hardware and/or software. The computing device may be part of the transaction receiver. The computing device may be separate from the transaction receiver. The computing device may be in electronic communication with the transaction receiver. The SCM may monitor an attempted transaction between the card and the card reader.

The SCM may be in electronic communication with a sensor module. The sensor module may be installed in the card reader. The sensor module may include one or more capacitive and magnetic sensors. The one or more capacitive and magnetic sensors may be installed in the card reader. The one or more sensors may be installed at strategic points in the card reader, such as, for example, where contact between the card and the card reader is expected. The one or more sensors may continuously monitor changes in capacitance between the card and the card reader. The one or more sensors may continuously monitor the presence of additional magnetic fields between the card and the card reader.

The one or more capacitive sensors may measure changes between the card and the card reader by detecting variations in capacitance. The one or more capacitive sensors may be calibrated to establish a baseline capacitance level when there is no card present at the card reader. The baseline may serve as a reference for detecting capacitance changes. A change in capacitance may indicate the presence and/or strength of a skimming and/or shimming device. The one or more capacitive sensors may identify the presence and strength of skimming and/or shimming devices.

The one or more magnetic sensors may measure changes in magnetic fields surrounding the card and the card reader. The magnetic sensors may identify the presence and strength of skimming and/or shimming devices. The one or more magnetic sensors may include inductive magnetic sensors. Inductive magnetic sensors may operate on the principle of electromagnetic induction. It should be noted that changes in the magnetic field may induce a voltage in a coil, and this voltage may be used by the magnetic sensors to measure field strength. Inductive sensors may be used for non-contact position sensing and metal detection.

A threshold may be set for capacitance changes and/or for additional magnetic fields that may indicate card insertion or removal. This threshold may be based on the expected range of capacitance variations during normal usage. The threshold may be stored in a threshold lookup table. The threshold lookup table may be stored in a memory location. The memory location may be included in the transaction receiver. The memory location may be remote from the transaction reader. The memory location be located within random access memory ("RAM"), read only memory ("ROM"), electrically erasable programmable read-only memory ("EEPROM"), flash memory, cache memory, cloud memory and/or any suitable memory location. The threshold lookup table may be a dynamic lookup table. The threshold lookup table may be updated by the SCM module. The threshold lookup table may be updated continually by the SCM module.

The SCM module may include a communication module. The communication module may receive and transmit sensor data transmitted from the one or more capacitive and magnetic sensors. The communication module may transmit the sensor data to a terminal software module ("TSM"). The communication module may include a transceiver. The communication module may receive and transmit sensor data using any suitable data transfer methods.

The TSM may execute on the computing device. The TSM may receive the sensor data transmitted from the communication module. The TSM may compare the received sensor data to the data stored in the threshold lookup table. Based on the comparison the TSM may output a threshold status. The threshold status may identify a threshold violation or threshold confirmation. The threshold status may include a threshold violation. The threshold violation may indicate that the sensor data fails to conform with the data included in the threshold lookup table. The threshold status may include a threshold confirmation. The threshold confirmation may indicate that the sensor data conforms with the data included in the threshold lookup table. The TSM may output a threshold violation or a threshold confirmation.

The TSM may transmit the threshold status to a dynamic mutual cryptographic authenticator ("DMCA"). The DMCA may execute on the computing device. The DMCA may receive the threshold status. In response to receipt of the threshold violation, the DMCA may terminate the transaction. Terminating the transaction may include instructing the card reader to terminate communication with the card. In the event that the transaction is terminated, the DMCA may transmit an alert to a cardholder of the card. The alert may be transmitted via the card reader. The alert may include a vibration. The alert may include a blinking light indicator.

In response to receipt of the threshold confirmation, the DMCA may initiate (or instantiate an instance of) an encrypted challenge response communication module ("ECRCM"). The ECRCM may execute on the computing device. The ECRCM may initiate a challenge response protocol through the communication module.

The challenge response protocol may trigger the card reader to transmit a first challenge to the card. The first challenge may be a randomized number to be authenticated. The randomized number may be included in a cryptographic token. The first challenge may include any suitable authenticator. In response to receiving the first challenge, the card may encrypt the first challenge at the card using a first private key included in the card. After encrypting the first challenge the card may transmit the encrypted first challenge from the card to the card reader.

The card reader may receive the encrypted first challenge from the card. In response to receiving the encrypted first challenge, the card reader may decrypt the encrypted first challenge using a second private key included in the card reader. After successfully decrypting the encrypted first challenge, the card reader may send a first confirmation confirming the decryption of the encrypted first challenge to the card.

In response to receipt of the first confirmation confirming decryption of the encrypted first challenge by the card reader, the card may transmit a second challenge to the card reader. The second challenge may be a second randomized number to be authenticated. The second randomized number may be included in a cryptographic token. The second challenge may be any suitable authenticator. The second challenge may be different from the first challenge. The second challenge may be encrypted with a first public key included in the card. The card reader may receive the second challenge. In response to receiving the second challenge, the card reader may decrypt the second challenge using the second private key. After decrypting the second challenge, the card reader may re-encrypt the second challenge using a second public key included in the card reader. After re-encrypting the second challenge the card reader may transmit the re-encrypted second challenge to the card.

The card may receive the re-encrypted second challenge. The card may decrypt the re-encrypted second challenge. The card may transmit a second confirmation confirming decryption of the re-encrypted second challenge to the card reader. In response to receiving a second confirmation confirming decryption of the re-encrypted second challenge by the card, the card reader may authenticate the transaction.

In the event that that the card does not receive the first confirmation and/or the card reader does not receive the second confirmation, the transaction may be terminated. Terminating the transaction may include instructing the card reader to terminate communication with the card. In the event that the transaction is terminated, an alert may be transmitted to a user associated with the card. The alert may be transmitted via the card reader. The alert may include a vibration. The alert may include a blinking light indicator.

Encrypting the first challenge may include encrypting using an advanced encryption standard ("AES") algorithm. Encrypting the first challenge may include encrypting using a Rivest-Shamir-Adleman ("RSA") algorithm. Encrypting the second challenge may include encrypting using an AES algorithm. Encrypting the second challenge may include encrypting using an RSA algorithm. Challenges may be dynamically changed by including a timestamp, location, unique device identifier for key exchange and signatures and/or any other suitable changes. Different challenges may be used for different transactions to prevent pre-recorded attacks.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone and/or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text and/or audio assistance files. The data stored in memory 115 may also be stored in cache memory and/or any other suitable memory.

I/O module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network ("LAN") interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include LAN 125 and a wide area network ("WAN") 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated if the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory and/or any other suitable memory.

Additionally, application program(s) 119, which may be used by computer 101, may include computer executable instructions for invoking functionality related to communication, such as e-mail, Short Message Service ("SMS"), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
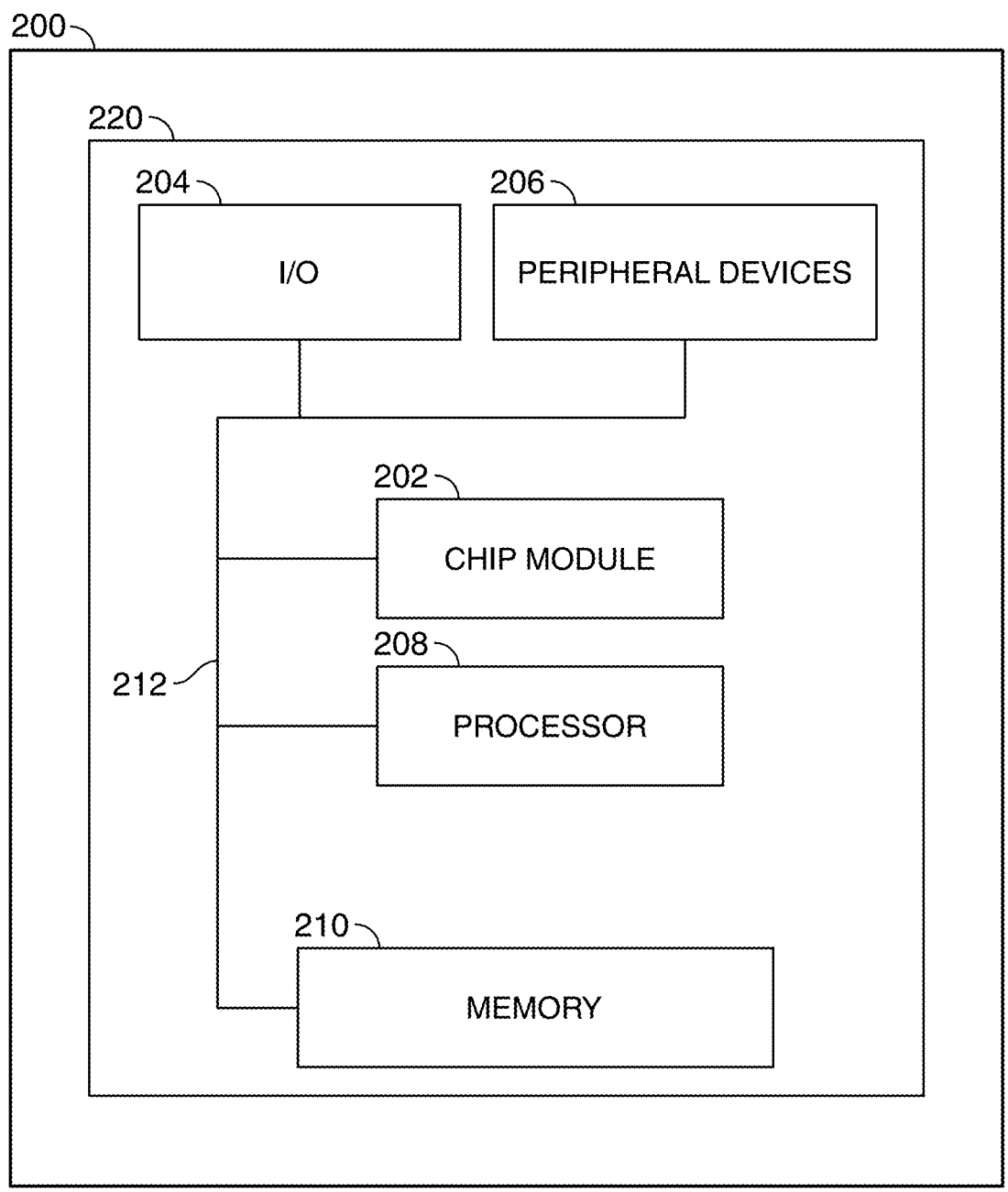
FIG. 2 shows another illustrative diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
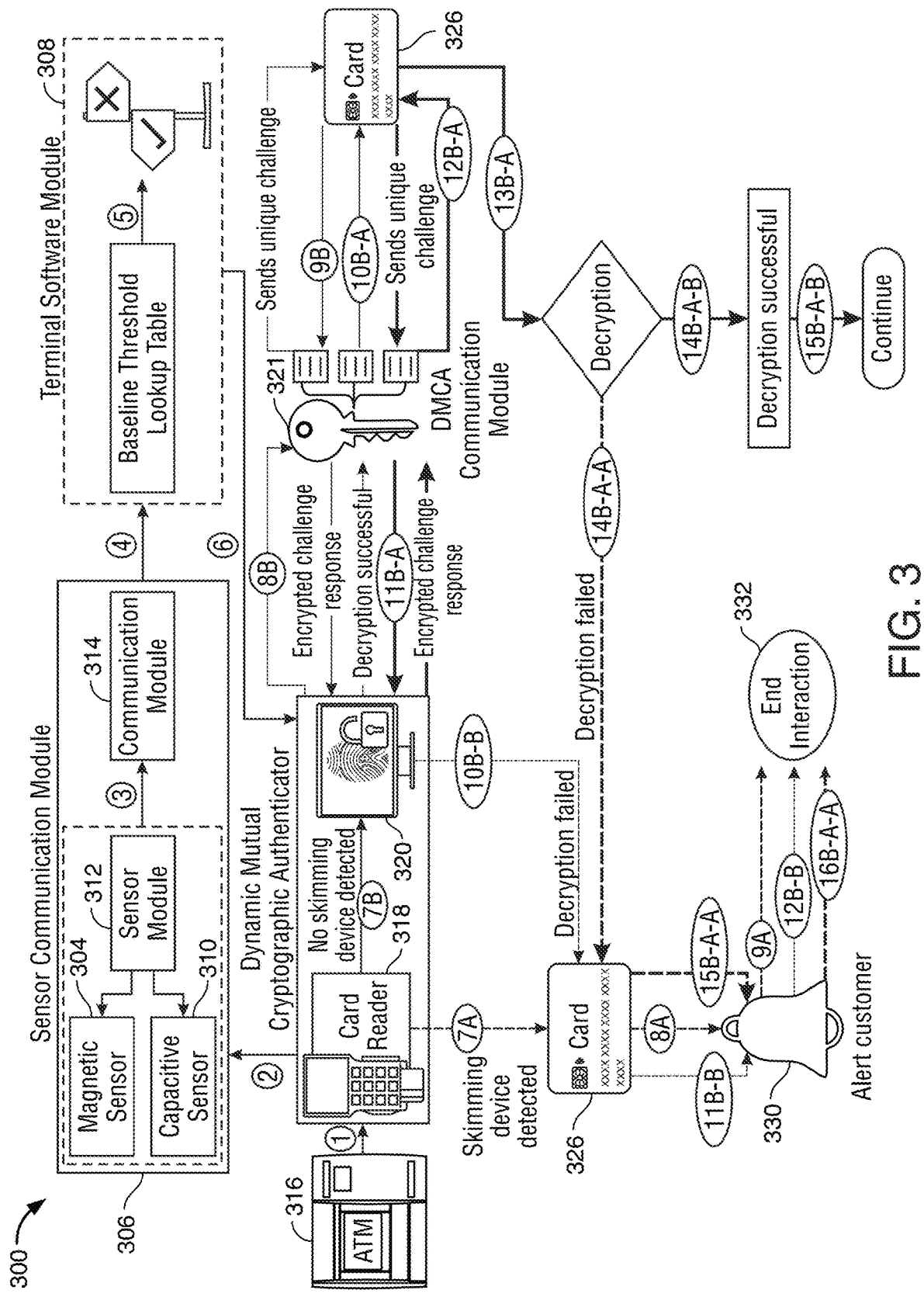
FIG. 3 shows yet another illustrative diagram in accordance with principles of the disclosure.

FIG. 3 shows an illustrative skimming and shimming detection process 300. Process 300 may be executed in real-time during transaction processing. Process 300 may detect and/or validate the absence of a skimmer and/or shimmer at a card reader in real-time during and/or prior to the processing of a transaction.

Prior to the execution of process 300, the system components, including the sensor communication module ("SCM") 306, terminal software module ("TSM") 308 (including the baseline threshold lookup table), dynamic mutual cryptographic authenticator ("DMCA") 320, DMCA communication module and an alert system may be instantiated and initialized prior to transaction processing.

It should be noted that a cardholder may be able to opt-in for skimming/shimming detection services. As such, in the event that a cardholder does not opt-in for skimming/shimming detection services, process 300 may be skipped and the transaction may be processed.

It should also be noted that process 300 does not retrieve card data from the card until the validation of the absence of a skimmer and/or shimmer has been completed. As such, the card data does not become vulnerable to a skimmer and/or shimmer until the card reader is verified as not being linked to a skimmer and/or shimmer.

Automated teller machine ("ATM") 316 may include card reader 318. At step 1, card reader 318 may receive card 326. Card reader 318 may include SCM 306. SCM 306 may include sensor module 312. Sensor module 312 may include magnetic sensor 304 and capacitive sensor 310. At step 2, capacitive sensor 310 and magnetic sensor 304 may sense card 326 being input into card reader 318. SCM 306 may include communication module 314. Sensor data from magnetic sensor 304 and capacitive sensor 310 may be transmitted to communication module at step 3. At step 4, communication module 314 may transmit sensor data relating to card 326 from sensor module 312 to TSM 308.

TSM 308 may receive sensor data from communication module 314 in real-time during a pending transaction. TSM 308 may compare the sensor data with data included in a threshold lookup table. Data included in a threshold lookup table may include baseline sensor data. TSM 308 may compare real-time data input from a pending transaction to the baseline sensor data (included in the threshold lookup table). In response to determining that the sensor data fails to conform with the data included in the threshold lookup table, at step 5, TSM 308 may output a threshold violation. In response to a determination that the sensor data conforms with the data included in the threshold lookup table, at step 6, TSM 308 may output a threshold confirmation.

TSM 308 may output the threshold violation or threshold confirmation to DMCA 320. In response to receiving a threshold violation at step 7A, DMCA 320 may initiate end interaction 332 at step 9A. Prior to initiating end transaction 332, alert 330 may be triggered at step 8A. Alert 330 may alert a user of card 326 that a skimming/shimming device was detected. Alert 330 may also alert an entity associated with card reader 318 or ATM 316 that a skimming and/or shimming device was detected.

In response to receiving a threshold confirmation at step 7B, DMCA 320 may transmit a first encrypted challenge via DMCA communication module 321 to card 326 at step 8B. At step 9B, in response to receiving the first encrypted challenge, card 326 may transmit a first encrypted challenge response to DMCA 320. At step 10B-A, DMCA 320 may decrypt the first encrypted challenge response and transmit a decryption success notification to card 326. In response to determining that the decryption was successful, card 326 may send a second encrypted challenge to DMCA 320 at step 11B-A. At step 12B-A, in response to receiving the second encrypted challenge, DMCA 320 may transmit a second encrypted challenge response to card 326.

At step 13B-A card 326 may decrypt the second encrypted challenge response. In response to a successful decryption of the second encrypted challenge response at step 14B-A-B, the transaction may be enabled and/or processed at step 15B-A-B.

In response to a failure to decrypt the first encrypted challenge response by DMCA 320 at step 10B-B, end interaction 332 may be initiated at step 12B-B. Prior to initiating end transaction 332, alert 330 may be triggered at step 11B-B. Alert 330 may alert a user of card 326 that a skimming/shimming device was detected. Alert 330 may also alert an entity associated with card reader 318 or ATM 316 that a skimming and/or shimming device was detected.

In response to a failure to decrypt the second encrypted challenge response by card 326 at step 14B-A-A, end interaction 332 may be initiated at step 16B-A-A. Prior to initiating end transaction 332, alert 330 may be triggered at step 15B-A-A. Alert 330 may alert a user of card 326 that a skimming/shimming device was detected. Alert 330 may also alert an entity associated with card reader 318 or ATM 316 that a skimming and/or shimming device was detected.

Figure 4:
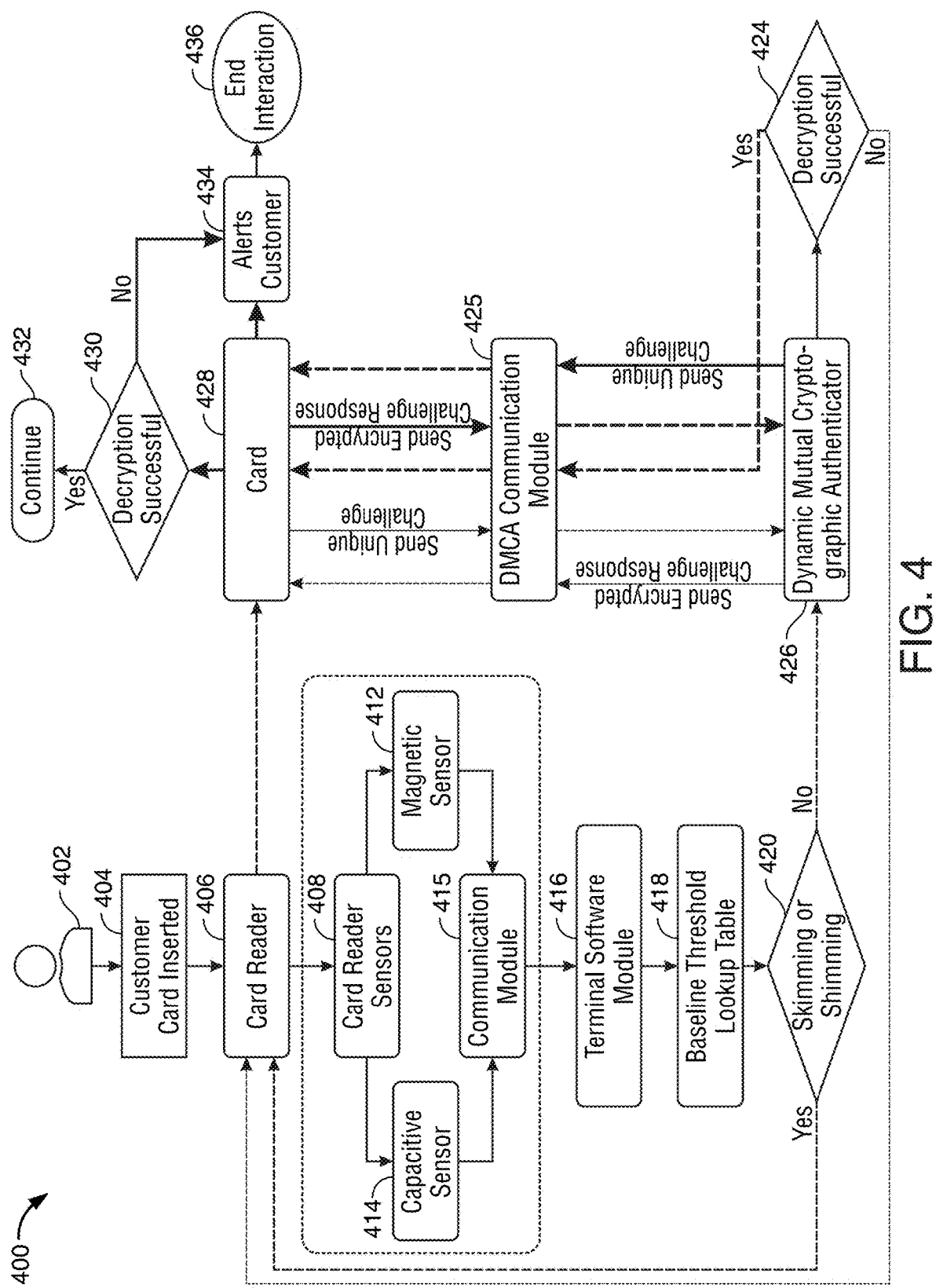
FIG. 4 shows yet another illustrative diagram in accordance with principles of the disclosure.

FIG. 4 shows illustrative skimming and shimming detection flow diagram. Process 400 may be executed in real-time during transaction processing. At step 404, customer 402 may insert card 428 into card reader 406. Card reader 406 may include card reader sensors 408. Card reader sensors 408 may include capacitance sensors 414 and magnetic sensor 412. Card reader sensors 408 may be in electronic communication with communication module 415. Card reader sensors 408 and/or communication module 415 may be located at (or in close proximity to) the card reader. Terminal software module 416 and baseline threshold lookup table 418 may be located at (or in close proximity to) the card reader. Terminal software module 416 and baseline threshold lookup table 418 may be located remote from the card reader. As such, the communication between communication module 415 and terminal software module 416 may be a communication over a network. The network may be wired or wireless.

Communication module 415 may transmit sensor data to terminal software module 416. Terminal software module 416 may compare sensor data to data included in baseline threshold lookup table 418. At step 420, based on the comparison terminal software module 416 may determine whether there is skimming or shimming devices. In response to identifying the presence of one or more skimming and shimming devices, card 428 may alert customer 402 at step 434. After alerting customer 402, step 436 may include ending the transaction.

In response to determining that there are no skimming and shimming devices, DMCA 426 may transmit a first encrypted challenge via DMCA communication module 425 to card 428. In response to receiving the first encrypted challenge, card 428 may transmit a first encrypted challenge response to DMCA 426. DMCA 426 may decrypt the first encrypted challenge response. In response to determining that the decryption was successful at step 424, card 428 may send a second encrypted challenge to DMCA 426. DMCA 426 may transmit a second encrypted challenge response to card 428. At step 430, in response to a successful decryption of the second challenge by card 428, the transaction may be authenticated at step 432.

In response to a failure to decrypt the first encrypted challenge response by DMCA 426 at step 424 and/or a failure to decrypt the second encrypted challenge response by card 428 at step 430, card 428 may alert customer 402 at step 434. After alerting customer 402, step 436 may include terminating the transaction.

Thus, methods and apparatus for a SKIMMER AND SHIMMER IDENTIFICATION AND PREVENTION SYSTEM are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. An apparatus for dynamic multi-level detection of compromised transaction receivers, the apparatus including:
   a sensor communication module ("SCM") configured to monitor a transaction between a card and a card reader, the SCM including:
      a sensor module including one or more capacitive and magnetic sensors, the sensor module installed in the card reader; and
      a communication module configured to receive and transmit sensor data transmitted from the one or more capacitive and magnetic sensors; and
   a terminal software module ("TSM") configured to:
      receive the sensor data transmitted from the communication module;
      compare the sensor data with data included in a threshold lookup table; and
      based on the comparison, output a threshold status, the threshold status indicating:
         a threshold violation in response to a determination that the sensor data fails to conform with the data included in the threshold lookup table; or
         a threshold confirmation in response to a determination that the sensor data conforms with the data included in the threshold lookup table; and
   a dynamic mutual cryptographic authenticator ("DMCA") configured to:
      receive the threshold status;

in response to receipt of the threshold violation terminate the transaction;
in response to receipt of the threshold confirmation, initiate an encrypted challenge response communication module ("ECRCM"), the ECRCM configured to initiate a challenge response protocol through the communication module, the challenge response protocol configured to:
trigger the card reader to transmit a first challenge to the card;
in response to receipt of the first challenge, the card is configured to:
encrypt the first challenge at the card using a first private key included in the card; and
transmit the encrypted first challenge from the card to the card reader;
in response to receipt of the encrypted first challenge, the card reader is configured to decrypt the encrypted first challenge using a second private key included in the card reader;
in response to receipt of a first confirmation confirming decryption of the encrypted first challenge by the card reader, the card is configured to transmit a second challenge to the card reader, the second challenge being encrypted with a first public key included in the card; and
in response to receipt of the second challenge, the card reader is configured to:
decrypt the second challenge using the second private key;
re-encrypt the second challenge using a second public key included in the card reader; and
transmit the re-encrypted second challenge to the card; and
in response to receipt of a second confirmation confirming decryption of the re-encrypted second challenge by the card, authenticate the transaction.

2. The apparatus of claim 1 wherein the one or more capacitive sensors are configured to measure changes between the card and the card reader by detecting variations in capacitance.

3. The apparatus of claim 1 wherein the one or more magnetic sensors are configured to measure changes in magnetic fields surrounding the card and the card reader.

4. The apparatus of claim 1 wherein the threshold lookup table is a dynamic lookup table configured to be updated by the SCM.

5. The apparatus of claim 1 wherein the DMCA is further configured to transmit an alert to a user associated with the card in response to receiving the threshold violation.

6. The apparatus of claim 5 wherein the alert includes a vibration.

7. The apparatus of claim 5 wherein the alert includes a blinking light indicator.

8. The apparatus of claim 1 wherein the first challenge is configured to be encrypted using an advanced encryption standard ("AES") algorithm.

9. The apparatus of claim 1 wherein the second challenge is configured to be encrypted using an advanced encryption standard ("AES") algorithm.

10. The apparatus of claim 1 wherein the first challenge is configured to be encrypted using a Rivest-Shamir-Adleman ("RSA") algorithm.

11. The apparatus of claim 1 wherein the second challenge is configured to be encrypted using a Rivest-Shamir-Adleman ("RSA") algorithm.

12. A method for dynamic multi-level detection of compromised transaction receivers, the method comprising:
monitoring, using a sensor communication module ("SCM"), a transaction between a card and a card reader, the SCM comprising:
a sensor module including one or more capacitive and magnetic sensors, the sensor module installed in the card reader; and
a communication module configured to receive and transmit sensor data transmitted from the one or more capacitive and magnetic sensors; and
using a terminal software module ("TSM"):
receiving the sensor data transmitted from the communication module;
comparing the sensor data with data included in a threshold lookup table; and
based on the comparing, outputting a threshold status, the threshold status comprising:
a threshold violation in response to a determination that the sensor data fails to conform with the data included in the threshold lookup table; and
a threshold confirmation in response to a determination that the sensor data conforms with the data included in the threshold lookup table; and
using a dynamic mutual cryptographic authenticator ("DMCA"):
receiving the threshold status;
in response to receiving the threshold violation terminating the transaction;
in response to receiving the threshold confirmation initiating an encrypted challenge response communication module ("ECRCM"), the ECRCM initiating a challenge response protocol through the communication module, the challenge response protocol comprising:
triggering the card reader to transmit a first challenge to the card;
in response to receiving the first challenge at the card:
encrypting the first challenge at the card using a first private key included in the card; and
transmitting the encrypted first challenge from the card to the card reader;
in response to receiving the encrypted first challenge at the card reader, decrypting the encrypted first challenge using a second private key included in the card reader;
in response to receiving a first confirmation confirming decryption of the encrypted first challenge from the card reader, transmitting, from the card to the card reader, a second challenge, the second challenge being encrypted with a first public key included in the card; and
in response to receiving the second challenge at card reader:
decrypting the second challenge using the second private key;
re-encrypting the second challenge using a second public key included in the card reader; and
transmitting the re-encrypted second challenge to the card; and
in response to receiving a second confirmation confirming decryption of the re-encrypted second challenge by the card, authenticating the transaction.

13. The method of claim 12 further comprising using the one or more capacitive sensors to measure changes between the card and the card reader by detecting variations in capacitance.

14. The method of claim 12 further comprising using the one or more magnetic sensors to measure changes in magnetic fields surrounding the card and the card reader.

15. The method of claim 12 further comprising continually updating the threshold lookup table.

16. The method of claim 12 further comprising using DMCA to transmit an alert to a user associated with the card in response to receiving the threshold violation.

17. The method of claim 16 wherein the alert includes a vibration.

18. The method of claim 16 wherein the alert includes a blinking light indicator.

19. The method of claim 12 further comprising encrypting the first challenge and the second challenge using an advanced encryption standard ("AES") algorithm.

20. The method of claim 12 further comprising encrypting the first challenge and the second challenge using a Rivest-Shamir-Adleman ("RSA") algorithm.

21. The method of claim 12 further comprising, upon authenticating the transaction:
    retrieving card data from the card;
    transmitting the card data to a transaction processing system; and
    processing the card data as a transaction at the transaction processing system.

\* \* \* \* \*